E. RIMAILHO.
REGULATING DEVICE FOR THE FLOW OF LIQUID IN ORDNANCE BUFFERS.
APPLICATION FILED JULY 27, 1917.
1,323,099.
Patented Nov. 25, 1919.
Fig. 1
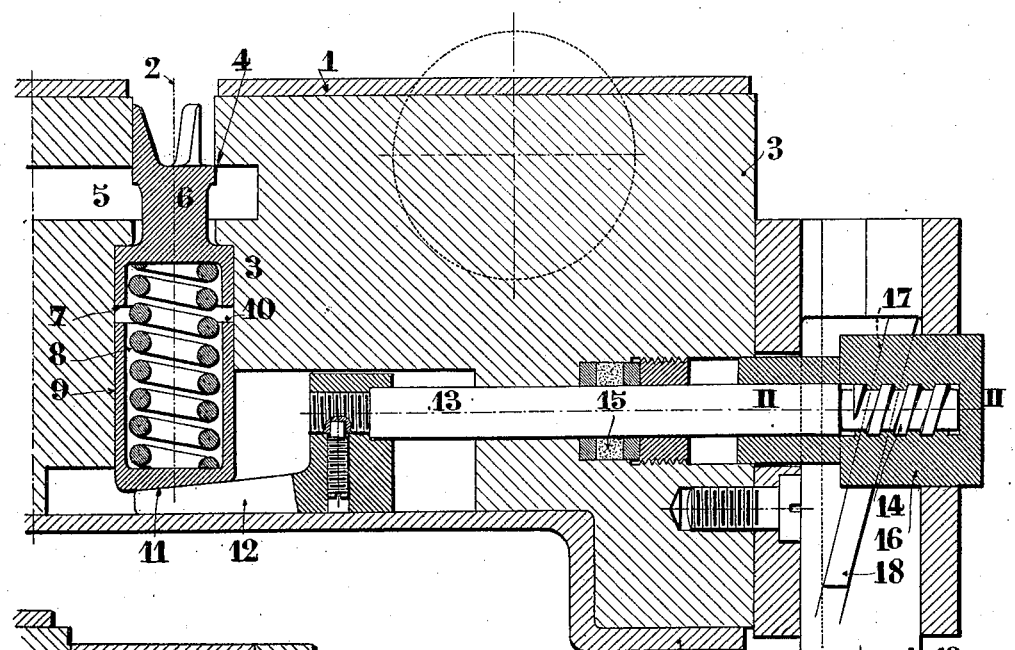
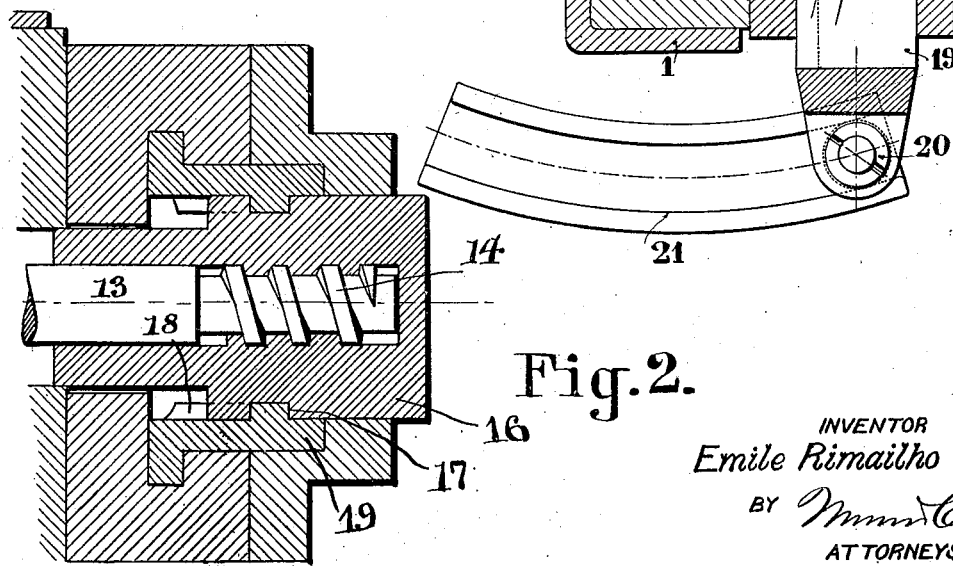
Fig. 2.
INVENTOR
Emile Rimailho
BY *Mmm Co.*
ATTORNEYS E. RIMAILHO.
REGULATING DEVICE FOR THE FLOW OF LIQUID IN ORDNANCE BUFFERS.
APPLICATION FILED JULY 27, 1917.

1,323,099.

Patented Nov. 25, 1919.
2 SHEETS—SHEET 2.

Inventor
Emile Rimailho
By
Attorneys

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

REGULATING DEVICE FOR THE FLOW OF LIQUID IN ORDNANCE-BUFFERS.

1,323,099.   Specification of Letters Patent.   Patented Nov. 25, 1919.

Application filed July 27, 1917. Serial No. 183,204.

*To all whom it may concern:*

Be it known that I, EMILE RIMAILHO, a citizen of the French Republic, and residing in Paris, France, 98 Rue de la Victoire, consulting engineer, have invented certain new and useful Improvements in and Relating to Regulating Devices for the Flow of Liquid in Ordnance-Buffers, of which the following is a complete specification.

In the ordnance-buffers, the flow of the liquid, during the recoil of the gun, is regulated so as to cause a resistance calculated in view of absorbing the whole momentum with which the recoiling mass is moving, and that, on the available recoil-length. For obtaining the best results in an ordnance, it is advantageous to be able to regulate this flow according to the conditions of firing; particularly when the angle of firing decreases, it is of interest to obtain an increased recoil in order to keep a better stability.

The device which is the object of the invention realizes accurately the regulation of the flow of the liquid in an ordnance-buffer according to the angular displacements imparted to the gun by automatically varying the area of the flow-orifice. Said device is equally adapted to be applied to a hydraulic buffer or to a hydropneumatic buffer, in which the liquid at rest is under pressure or not. It has the peculiarity of having its regulating elements located inside the buffer, in a block of metal, and these elements are connected with the external drive by a single rod or like element, which enables the tightness of the whole to be easily secured.

In the accompanying drawings, which illustrate, by way of example, the application of the device to hydropneumatic buffers:

Figure 1 is a flow-regulating-device, the regulating elements of which are internal and the drive of which is external.

Fig. 2 is a section upon the line II—II of Fig. 1.

Figure 3:
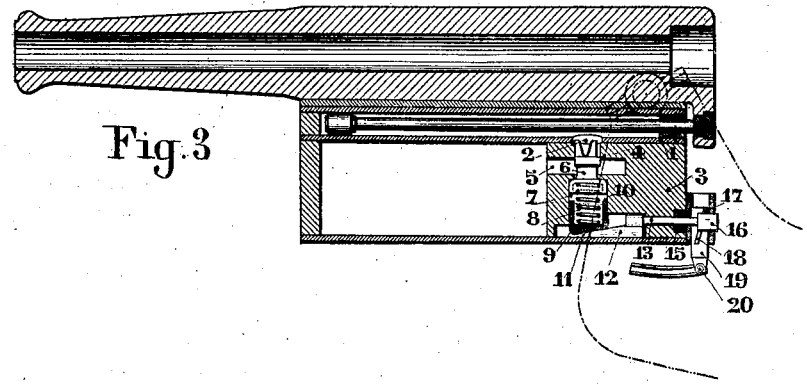
Fig. 3 shows diagrammatically the buffer mounted on a gun, in position of rest, the parts being regulated for a long recoil.

The buffer-body 1 is bored with the orifice 2 for the inlet of the liquid into the regulator-body 3; 4 is the orifice for the flow of the liquid to be regulated; 5 is the orifice through which the liquid flows into the regulator, 6 the recoil-valve, of which 7 is the abutment-face, 8 the valve-spring propped upon the abutment-socket 9, the face 10 of which limits the lift of the valve, and which is in contact, by its inclined face 11, with the regulating wedge 12 rigid with the rod 13, the end 14 of which passes outside the regulator-body 3 of the buffer body 1. A joint 15 insures the tightness around the rod 13.

To the end 14 is secured a socket 16 provided with a groove 17 into which slide the inclined ribs 18 of the controlling rule 19, one end, provided with the roller 20, of which is engaged with the cam 21 secured to the stationary part of the mounting. It will be easily understood that, during the sighting, the roller 20 of the rule 19, by following the carefully calculated sinuosities of the cam 21, imparts to the socket 16 longitudinal movements which are transmitted to the socket 9 by the wedge 12, which movements have for effect to increase or decrease the clearance limiting the lift of the valve between the face 7 and the face 10, and to thus automatically regulate the area of the orifice 4 for obtaining the variations of resistance to the flow of the liquid as functions of the angles of firing.

Figure 4:
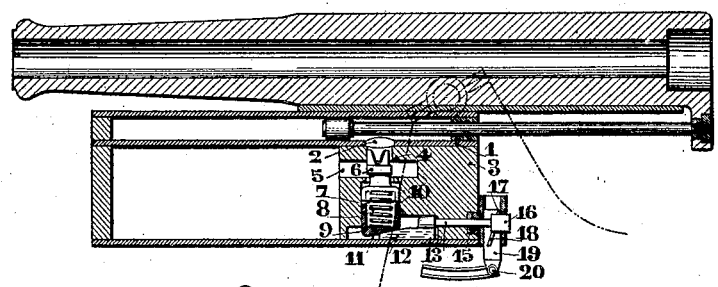
Fig. 4 is a view similar to Fig. 3 showing the parts toward the end of the recoil.
Figure 5:
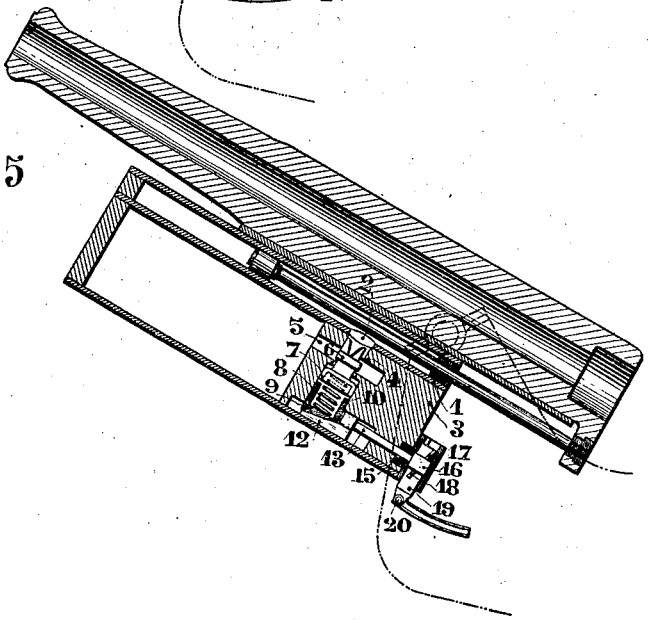
Fig. 5 shows the parts in the position occupied for a great training angle, the gun being toward the end of the recoil.

For the small angles of elevation, the parts occupy at rest the position shown in Fig. 3, the roller 20 being at the right hand end of the cam 21, and the wedge 12 has only its extremity engaged under the socket 9, thus permitting the valve 6 to effect its greatest lift shown in Fig. 4 and allowing the gun make its longest recoil. For longer angles of elevation, the roller 20 comes to the opposite end of the cam 21, thus pushing the wedge 12 toward the left and reducing the lift allowed the valve 6 as shown in Fig. 5, which reduces the passage of the liquid of the brake.

What I claim is:—

1. A regulating device for the flow of liquid in ordnance buffers comprising,—a valve-controlled opening, a movable abutting member for the valve, means for operating the abutting member to vary the distance between the same and the valve whereby the size of the opening controlled by the valve may be varied, and means operable by the vertical movement of the ordnance for actuating said means which operates the abutting member whereby the displacement of the valve in the opening may be varied in a predetermined ratio to the vertical movement of the ordnance.

2. In a regulating device for the flow of liquid in ordnance buffers, a buffer, a liquid chamber communicating with the buffer, a valve for controlling the communication between the buffer and liquid chamber, a movable member, a spring between the movable member and valve, and means controlled by the movement of the ordnance in the vertical plane for operating the movable member whereby the valve will be displaced according to the vertical movement of the ordnance.

3. A regulating device for the flow of liquid in ordnance buffers comprising,—a valve-controlled opening, a sliding member adapted to limit the displacement of the valve in the opening, a spring interposed between the valve and the sliding member, a wedge for varying the distance between the sliding member and the valve, and means for actuating the wedge operable by the vertical displacement of the ordnance.

4. In a regulating device for the flow of liquid in ordnance buffers, a buffer, a liquid chamber communicating with the buffer, a valve controlling the communication between the buffer and liquid chamber, the valve having a recess in its bottom, a sliding socket below the valve and spaced therefrom, a spring in the socket and the recess of the valve, a wedge engaging the bottom of the socket, and means for operating the wedge by the vertical displacement of the ordnance.

5. In a regulating device for the flow of liquid in ordnance buffers, a buffer, a liquid chamber communicating with the buffer, a spring pressed valve for controlling the communication between the buffer and liquid chamber, and means controlled by the movement of the ordnance in a vertical plane for varying the tension of the spring of the valve and thereby vary the movement of the valve.

In testimony whereof I have hereunto set my hand at St. Étienne, France, this 20th day of June, 1917.

EMILE RIMAILHO.

In the presence of two witnesses:
 JEAN BUYERSY,
 DAVIS B. LEWIS.